United States Patent [19]

Jick

[11] Patent Number: 4,913,942

[45] Date of Patent: Apr. 3, 1990

[54] REGENERATIVE DESICCANT BUNDLE

[76] Inventor: John J. Jick, P.O. Box 3716, Beverly Hills, Calif. 90212

[21] Appl. No.: 286,939

[22] Filed: Dec. 20, 1988

[51] Int. Cl.⁴ ............................................. B01D 53/14
[52] U.S. Cl. .................................... 428/35.2; 55/387; 206/204; 428/36.1; 428/99; 428/102
[58] Field of Search ........................... 206/204; 55/387; 428/35.2, 36.1, 99, 102

[56] References Cited

U.S. PATENT DOCUMENTS

| | | | |
|---|---|---|---|
| 2,548,780 | 4/1951 | Gary et al. | 206/204 X |
| 2,557,432 | 6/1951 | Holstedt | 55/387 X |
| 2,578,324 | 12/1951 | Southwick, Jr. | 206/204 X |
| 2,581,684 | 1/1952 | McKenzie | 55/387 |
| 2,674,509 | 4/1954 | Barnet | 206/204 X |
| 2,842,223 | 7/1958 | Zall | 206/204 X |
| 2,994,404 | 8/1961 | Schifferly | 206/204 X |
| 3,084,984 | 4/1963 | Adler | 206/204 X |
| 4,177,048 | 12/1979 | Rivers et al. | 55/387 X |
| 4,425,410 | 1/1984 | Farrell et al. | 428/36.7 X |
| 4,464,443 | 8/1984 | Farrell et al. | 428/36.7 X |
| 4,645,519 | 2/1987 | Fraioli et al. | 55/387 X |

*Primary Examiner*—Henry F. Epstein
*Attorney, Agent, or Firm*—Roger A. Marrs

[57] ABSTRACT

A desiccant bundle is disclosed herein having front and back sheets of porous fabric material joined about edge marginal regions and across the middle to define a plurality of sealed compartments. A multiplicity of multiple surface desiccant granules are situated in each compartment for absorbing moisture in the fabric material or passing through it. Hangers are provided for detachably securing the desiccant bundle to supporting structure in a humid or wet environment.

1 Claim, 1 Drawing Sheet

REGENERATIVE DESICCANT BUNDLE

BACKGROUND OF THE INVENTION

1. Field of the Invention

The present invention relates to dehumidification apparatus, and more particularly to a novel regenerative desiccant bundle adapted to absorb moisture from a surrounding environment and further being adapted to be dried and reused.

2. Brief Description of the Prior Art

In the past, it has been the conventional practice to employ a variety of desiccant materials for absorbing moisture present in rooms, boat interiors, instrument packages and the like. In some instances, dehumidifiers take the form of electric devices, such as lights, which generate heat in order to effect drying of a moisture environment. In other instances, crystals, such as silica gel, are employed in elastomeric webs. In the latter instance, the silica gel is of micron-size similar to a powder.

In the majority of instances cited above, the removal of moisture is limited to a small amount of water and such devices are not useful in an extremely wet environment, such as freezers or the like. In instances where silica gel is employed, the desiccant becomes readily saturated with moisture and cannot be dried for subsequent use. Therefore, in the latter instance, the desiccant package must be discarded.

Therefore, a long standing need has existed to provide a moisture absorbing packet or bundle which may be placed in an extremely wet environment, such as a walk-in freezer where wetness generally forms into ice and provides an unsafe condition. Such a bundle or packet must include a desiccant, such as in crystalline form, which offers high capacity of moisture accumulation and which is suitable for heat drying, such as in an oven, so that the packet or bundle can be reused.

SUMMARY OF THE INVENTION

Accordingly, the above problems and difficulties are obviated by the present invention which provides a novel regenerative desiccant bundle or packet comprising porous material sheets which are placed together so that their edge marginal regions can be joined and wherein attachment means are further crisscrossed across the joined sheets in order to define a plurality of pockets or compartments. Each pocket or compartment includes a desiccant in the form of multi-side or surfaced crystals having high capacity of moisture absorption and storage capabilities. Means are employed for detachably mounting or holding the packet or bundle to supporting structure which is located in an extremely wet environment. The fabric material is characterized as being highly porous so as to conduct moisture therethrough from the surrounding environment into the desiccant crystals. The packet or bag is reinforced about the attachment or securement means so that the accumulated weight of moisture within the desiccant crystals in each of the respective pockets or compartments will not tear or unduly fatigue the sheet material.

Therefore, it is among the primary objects of the present invention to provide a novel regenerative desiccant packet or bundle having the ability to absorb moisture in the ratio of one pound of moisture for nine pounds of desiccant material.

Another object of the present invention is to provide a novel desiccant bundle having a plurality of desiccant crystals or granules offering multi-sided surfaces in order to absorb the maximum amount of surrounding moisture.

Another object of the present invention is to provide a novel regenerative desiccant pack or bundle that employs desiccant material adapted to be heatdried, such as in an oven, so that the packet or bundle may be reused time and time again.

Yet another object of the present invention is to provide a novel dehumidifying bundle or packet presenting a greater area of exposed desiccator surface than in conventional use so that maximum moisture absorption and retention is assured.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figures 1, 2, 3, 4:
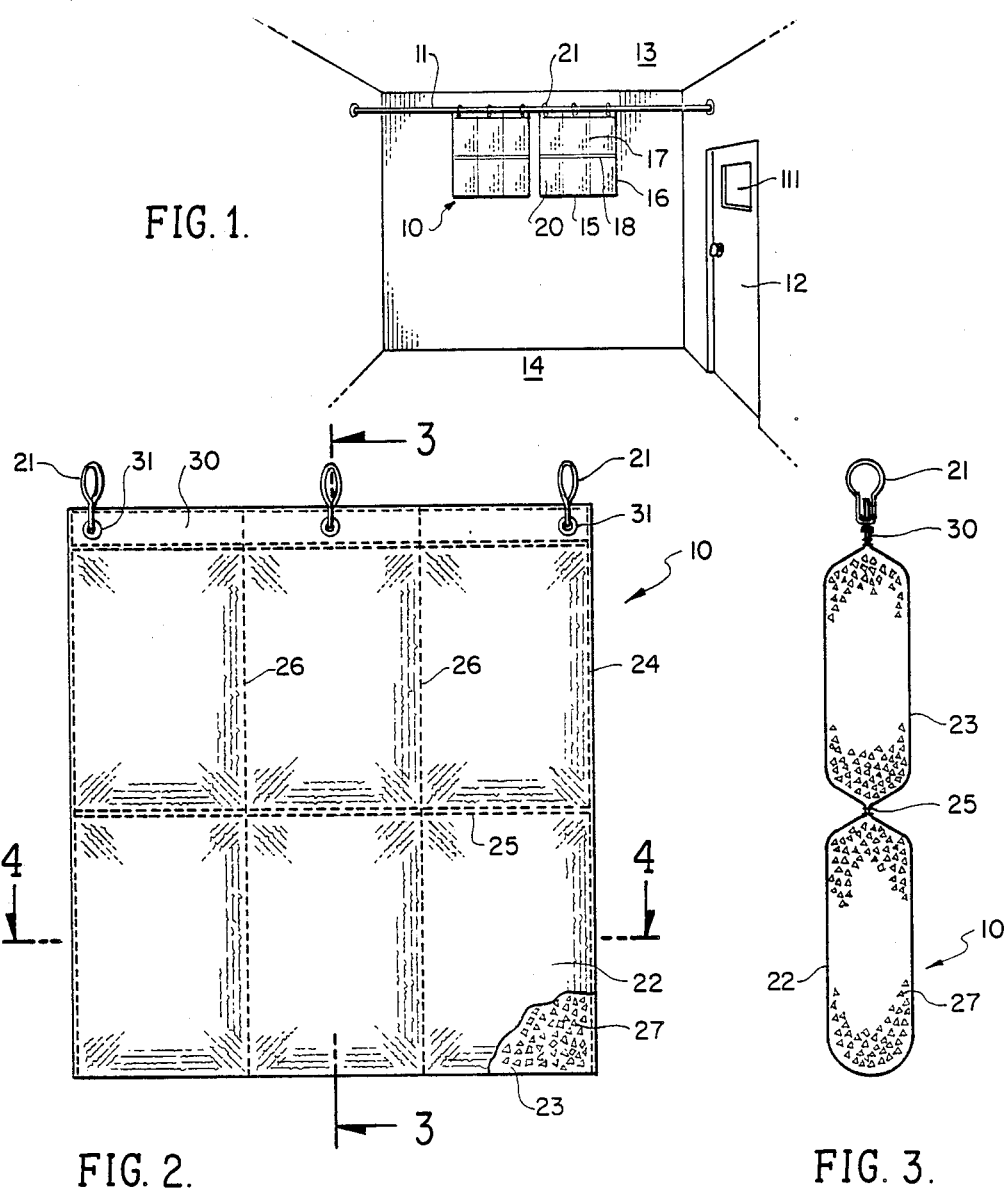
FIG. 1 is a perspective view of a typical walk-in freezer offering an extremely wet environment in which the novel regenerative desiccant pack or bundle is used.
FIG. 2 is an enlarged front elevational view of the novel regenerative desiccant package incorporating the present invention.
FIG. 3 is a transverse cross-sectional view of the regenerative desiccant pack or bundle shown in FIG. 2 as taken in the direction of arrows 3—3 thereof.
FIG. 4 is a longitudinal cross-sectional view of the pack or bundle illustrated in FIG. 2 as taken in the direction of arrows 4—4 thereof.

Referring to FIG. 1, the novel regenerative desiccant pack or bundle of the present invention is illustrated in the general direction of arrow 10 and is being illustrated as downwardly depending or suspended from a support rod 11. The support rod is in a humidity or moisture environment, such as a walk-in freezer or the like. In such an instance, a room is provided having an access door 12 incorporating a window 111. Normally, because of the extreme low temperature, moisture collects at the ceiling, indicated by numeral 13, which turns into icicles, frost or similar moisture-laden elements which then fall, drip or otherwise rest on the floor 14 of the room. However, by suspending the inventive desiccant pack or bundle 10 near the ceiling 13, moisture in the air is drawn or sucked into the pack or bundle and absorbed by the enclosed desiccant contained therein.

In one form of the invention, a pack is indicated by numeral 15 which includes an edge marginal region 16 joining adjacent regions together by stitching or the like of a pair of sheets. Also, additional attachment means for joining the pair of sheets together is indicated by lines 17 and 18 whereby a plurality of compartments are defined, such as compartment 20. A quantity of granular or crystalline desiccant particles is captured within each of the pockets or compartments and the pair of sheets is of porous material so that surrounding moisture will be drawn through the material into the desiccant particles. Hangers, such as loop 21, downwardly suspend each of the desiccant packs or bundles from the support rod or pipe 11. It is to be understood that the packs or bundles may be supported by an suitable structure located in the room.

Referring now in detail to FIG. 2, the desiccant package or bundle 10 is illustrated wherein the edge marginal regions of a pair of sheets 22 and 23 are illustrated as being the same shape or overall configuration so that they are conformal when placed against one another and joined about the edge marginal regions in order to provide an enclosed pouch. In the present instance, the edge marginal regions are stitched together, such as by stitching 24, and preferably, the stitching goes around the entire peripheral edge marginal region. Inasmuch as absorption of water into the desiccant will cause an increase in weight, the stitching is reinforced so that the added weight can be accommodated.

Additionally, attachment means such as stitching is passed through the midsection of the pouch, as indicated by numeral 25, and other stitching is introduced in spaced vertical arrangement, such as stitching 26, which is normal to the stitching 25 so that a plurality of compartments or individual pockets are defined. Each of the pockets is employed for enclosing a quantity of desiccant particles which may be of granular or crystal formation. Such a crystal is indicated by numeral 27 and it is to be understood that the particle size is substantially large, such as an average of 1/32nd in thickness. Each of the granules or particles is considered multi-sided so as to provide a greater area for exposure to atmosphere for the collection or absorption of moisture in the surrounding air.

It is to be understood that the sheet material is fabric, such as cotton canvas, and preferably, of a 7 ounce weight so that the fabric may "breathe" which draws moisture into the chemical desiccant. Because of the porousness of the fabric, a powdered desiccant or any type of desiccant which is of micro size is totally unsuitable. Furthermore, the bundle or pack of the present invention is suitable for reuse by drying of the desiccant in a heated environment such as in an oven. Powder or desiccant of small micro size is not adaptable for drying in this manner and would only form a sticky mass.

In order to reuse or dry the bundle or pack, the bundle or pack is subjected to oven temperature at approximately 250 degrees in temperature. Powder would normally break down under such circumstances and this would reduce the life use of the desiccant. Therefore, the large size granules and particles offer long shelf life and long reusability for the inventive desiccant bundle.

In some instances, a coloring such as dye may be put into the fabric and at times, graphic representations or other indicia can be carried on the exterior face of the fabric.

Referring now in detail to FIGS. 2, 3 and 4, it can be seen that the upper edge marginal region, as identified by numeral 30, is reinforced by stitching and includes eyelets, such as eyelet 31, for releasably retaining a fastener, such as a hanger 21. Other means of suspending or supporting the package or pack is envisioned and the present invention is not limited to hangers. FIGS. 3 and 4 show the horizontal stitching 25 and the vertical stitching 26 serving as attachment means or securing means for defining the respective pockets between the opposing surfaces of the fabric sheets 22 and 23.

In view of the foregoing, it can be seen that the inventive regenerative desiccant pack or bundle of the present invention is suitable for absorbing a substantial quantity of moisture from the surrounding environment and that once fully absorbed to its capacity, the pack or bundle may be dried out, utilizing a conventional oven or the like so that reuse is available. The bundle may consist of a single compartment or may be defined as having a plurality of compartments such as illustrated.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In combination with a walk-in refrigerator having a heavily laden moisture environment, the improvement comprising:

a plurality of overhead supporting structure arranged in parallel spaced-apart relationship across the top of said refrigerator.

a plurality of moisture absorbing pouches carried on said overhead support structure so as to downwardly depend therefrom;

each of said pouches composed of a porous fabric having an internal enclosed compartment;

a quantity of desiccant particles disposed in said pouch compartment substantially occupying the entire volume thereof;

said desiccant particles being of a multiple exposed surface exterior of a diameter larger than 1/32 of an inch;

attachment means releasably connected to each of said pouches for suspending said pouch from said supporting structure in said moisture environment;

said attachment means includes a plurality of spaced-apart hangers detachably secured along the edge marginal region of said pouch;

said pouch includes reinforcement means integrally carried about the edge marginal regions thereof;

said pouch includes a plurality of compartments arranged side-by-side in rows and columns having each of said compartments defined by linear stitching integrally joining a pair of porous fabric sheets together so that opposing surfaces of said sheets enclose said quantity of desiccant particles;

said fabric sheets are pervious to moisture so as to absorb and retain moisture; and said fabric sheets and said particles are regenerated and adapted to be ambient heat dried for reuse.

* * * * *